(12) United States Patent
Partlow

(10) Patent No.: US 10,716,395 B2
(45) Date of Patent: Jul. 21, 2020

(54) ADJUSTABLE MULTIPURPOSE HOLDER

(71) Applicant: Estrella Bedania Partlow, Menifee, CA (US)

(72) Inventor: Estrella Bedania Partlow, Menifee, CA (US)

( * ) Notice: Subject to any disclaimer, the term of this patent is extended or adjusted under 35 U.S.C. 154(b) by 0 days.

(21) Appl. No.: 16/160,416

(22) Filed: Oct. 15, 2018

(65) Prior Publication Data

US 2020/0113325 A1    Apr. 16, 2020

(51) Int. Cl.
    *A47B 23/06*     (2006.01)
    *A47G 1/14*     (2006.01)
    *A47B 97/08*     (2006.01)
    *F16B 1/00*     (2006.01)

(52) U.S. Cl.
CPC .............. *A47B 23/06* (2013.01); *A47B 97/08* (2013.01); *A47G 1/14* (2013.01); *F16B 1/00* (2013.01); *F16B 2001/0035* (2013.01)

(58) Field of Classification Search
CPC combination set(s) only.
See application file for complete search history.

(56) References Cited

U.S. PATENT DOCUMENTS

| | | | | |
|---|---|---|---|---|
| 884,722 | A * | 4/1908 | Davis | A47B 23/042 248/452 |
| 1,161,339 | A * | 11/1915 | Putnam | A47B 23/042 248/452 |
| 1,853,340 | A * | 4/1932 | Dickinson | A47B 23/04 248/451 |
| 2,489,553 | A * | 11/1949 | Wofford | A47B 23/043 190/1 |
| 3,168,363 | A * | 2/1965 | Monsour | A47B 97/08 312/231 |
| 3,833,197 | A * | 9/1974 | Dyke | A47B 23/042 248/441.1 |
| 3,952,989 | A * | 4/1976 | Bannister | A47B 23/043 248/453 |
| 4,093,326 | A * | 6/1978 | Ford | A47B 97/08 248/461 |
| 4,150,807 | A * | 4/1979 | Manso | A47B 23/06 248/452 |
| 4,944,402 | A * | 7/1990 | Wu | A45D 33/20 132/287 |
| 5,029,798 | A | 7/1991 | Clark | |
| 5,067,682 | A | 11/1991 | Figaro | |

(Continued)

*Primary Examiner* — Monica E Millner
(74) *Attorney, Agent, or Firm* — Lamon Patent Services; Cynthia S. Lamon

(57) ABSTRACT

A multipurpose holder designed for books, electronic devices, and fine art. It is comprised of a solid back and durable base that can support large items. An adjustable rear back support is held in place by an oval-shaped ring and tightened with screws. A rear back support allows for inclination of the multipurpose holder. Two feet provide stabilization. Two hinges hold a magnetic swinging visor in place and the visor can be placed in the upward or the downward position. When the visor is in the downward position, a built-in storage embodiment is easily accessible. The storage embodiment has an exterior box and interior compartment. There are hooks at the back and magnetic components at the front to allow for the attachment of accessories. It is light in weight and has handles that make it easy to carry.

8 Claims, 7 Drawing Sheets

(56) References Cited

U.S. PATENT DOCUMENTS

| | | | | |
|---|---|---|---|---|
| 5,215,364 A * | 6/1993 | Moore | | A47B 77/10 312/323 |
| 5,295,742 A * | 3/1994 | Knutson | | A01K 97/06 108/43 |
| 5,460,102 A * | 10/1995 | Pasmanick | | A47B 23/002 108/25 |
| 5,655,651 A * | 8/1997 | Maier | | A47B 97/08 206/1.7 |
| 5,680,973 A * | 10/1997 | Vulpitta | | A45C 9/00 108/43 |
| 5,810,316 A * | 9/1998 | Eby | | A47B 23/043 248/451 |
| 5,979,337 A * | 11/1999 | Clark | | A47B 23/06 108/23 |
| 6,045,108 A * | 4/2000 | Cziraky | | A45C 9/00 248/454 |
| 6,513,779 B2 | 2/2003 | Halpin | | |
| 6,571,922 B1 * | 6/2003 | Ruhmanseder | | A45C 3/02 108/25 |
| 6,675,721 B2 * | 1/2004 | Zeiders | | A47B 23/041 108/25 |
| 6,981,778 B2 * | 1/2006 | Dow | | A47B 13/12 362/155 |
| 7,055,442 B2 * | 6/2006 | Podd | | A47B 23/001 108/25 |
| 7,172,167 B2 * | 2/2007 | Phifer | | A47B 23/042 108/11 |
| 7,185,869 B2 | 3/2007 | Smith | | |
| 8,104,733 B2 * | 1/2012 | Skolnik | | A47B 23/04 248/441.1 |
| 8,327,774 B1 * | 12/2012 | Rivera | | B60N 3/005 108/44 |
| 8,424,830 B2 | 4/2013 | Yang | | |
| 8,490,551 B1 * | 7/2013 | Wagner | | A47B 31/04 108/25 |
| D692,950 S | 11/2013 | Evans | | |
| 8,635,959 B1 * | 1/2014 | Silknitter | | A47G 23/0608 108/159.12 |
| 9,044,688 B1 * | 6/2015 | Janay | | A63H 33/04 |
| 9,492,904 B1 * | 11/2016 | Dunn | | B23Q 3/18 |
| 9,602,904 B2 * | 3/2017 | Sutton, III | | H04R 1/028 |
| 2005/0211138 A1 * | 9/2005 | Gupta | | D03D 15/0022 108/43 |
| 2006/0108494 A1 | 5/2006 | Lancet | | |
| 2006/0201397 A1 * | 9/2006 | Sackman | | A47B 13/081 108/38 |
| 2007/0131836 A1 * | 6/2007 | Ross | | A47B 23/06 248/444.1 |
| 2008/0257224 A1 * | 10/2008 | Pellegrino | | A47B 41/02 108/1 |
| 2009/0166504 A1 * | 7/2009 | Lorenzatti | | A47B 23/044 248/444.1 |
| 2011/0056412 A1 * | 3/2011 | Grammer | | A45C 9/00 108/6 |
| 2011/0068245 A1 * | 3/2011 | Livingston | | A47B 23/043 248/460 |
| 2015/0192245 A1 * | 7/2015 | Hood | | F16M 13/06 224/257 |
| 2015/0374118 A1 * | 12/2015 | van Hooft | | A47B 23/043 248/451 |

\* cited by examiner

FIG. 7
FIG. 7A
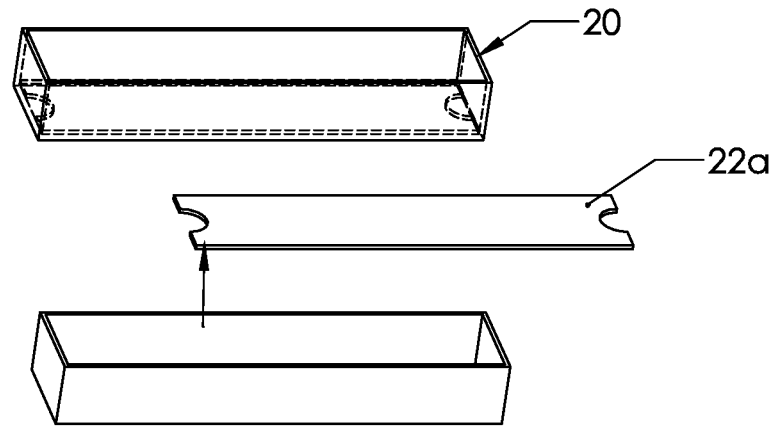
FIG. 7B
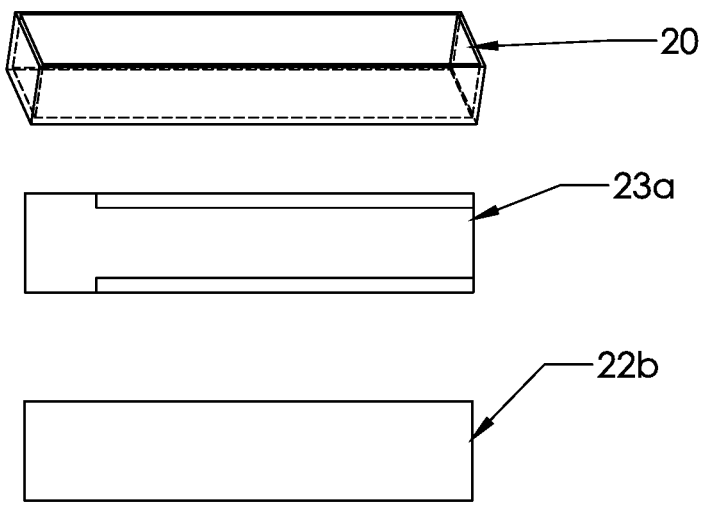
FIG. 7C
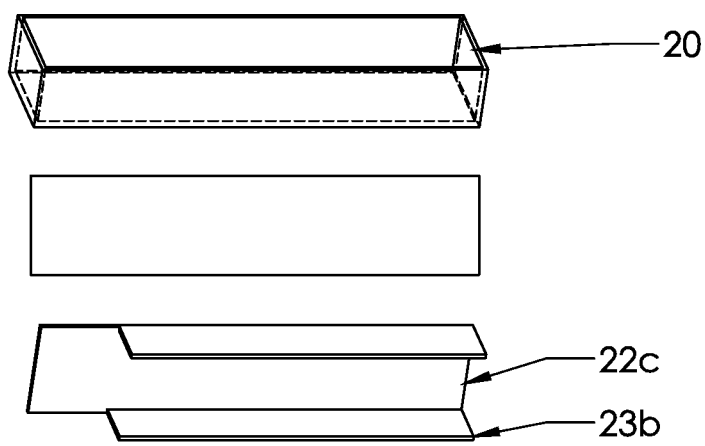

ADJUSTABLE MULTIPURPOSE HOLDER

CROSS-REFERENCE TO RELATED APPLICATIONS

This application claims the benefit of PPA Ser. Nr. 62/577,528, filed Oct. 26, 2017, which is incorporated by reference.

BACKGROUND OF THE INVENTION

1. Field of the Invention

This application relates to book holders with an adjustable inclination and folding sheet retainer, containing housing for components.

2. Discussion of the State of the Art

Originally book holder or book stand devices were provided for readers to use for specific, individual purposes. Some use cookbook stands while cooking for easy viewing without using their hands to hold the book. Others prefer an upright ergonomically correct device to read comfortably without eyestrain or neck discomfort, as opposed to placing the book on a flat surface to read with the head bent downward for long hours at a time. The following is a list of relevant prior art patents existing in the field thus far:

1. U.S. Pat. No. 5,029,798, by Thomas A. Clark, Jul. 9, 1991.

A portable book stand made of rigid material with a shelf and support members. It has support flaps beneath the shelf and auxiliary tab-like supports that hold book pages in place. I have found that tab-like support members are complex and difficult to assemble.

2. U.S. Pat. No. 5,067,682, by Davy J. Figaro, Nov. 26, 1991.

A book holder using an "L" shaped swinging-assembly with an adjustable support for different sized books. It has a page retainer to allow flipping the pages of a book. I have found that this model has many useful features; however, using gravity to hold a book in place requires two hands to turn the pages of a book when the page retainer is in the downward position.

3. U.S. Pat. No. 6,513,779 B2, by Patty Halpin, Feb. 4, 2003.

A book holding device with a wire in a U shape that holds the book in place. I have found that rigid U-shaped arm designs are difficult to maneuver.

4. U.S. Pat. No. 7,185,869 B2, by Ron Smith, Mar. 6, 2007.

A portable folding book stand with a shelf and pivoting legs. I have found that a smaller shelf cannot support large items.

5. U.S. Pat. No. 8,424,830 B2, by Hsin-Yung Yang et al., Apr. 23, 2013.

A portable electronic device holder with several boards to support the device. I have found that such a design is limited when used for purposes other than electronic devices.

6. U.S. Pat. No. D692,950 S, by Damian Evans, et al., Nov. 5, 2013.

A cookbook stand with ornamental design that acts as an easel for books. It has two support flaps to hold the book in place. I have found that small support flaps appear flimsy.

7. U.S. Patent Application 2006/0108494 A1, by Gary Lancet, May 25, 2006.

A book stand with a support and adjustable latch to hold the book stand at various angles. By making the upper pivotally attached member in this design smaller than the lower pivotally attached member, it must be folded from the bottom up rather than the top down. I have found that bottom up folding devices are not as structurally sound as devices that fold from the top down.

8. The Townsend Cookbook Stand, www.touchofclass.com, last accessed Sep. 29, 2018.

A cookbook stand designed to hold books when cooking. I have found that fixed page retainers obstruct a portion of the visual display. It also makes it difficult to turn the pages of a book.

In conclusion, insofar as I am aware, no book stand nor device holder has been developed like the present embodiment.

BRIEF SUMMARY OF THE INVENTION

To accomplish the objectives of the Adjustable Multipurpose Holder, the embodiment has a thin solid metal body. There are two sections for magnetic material. The first section is the entire top portion of the body. The second section is at the front of the visor. Accessories may be attached to the magnetic material.

The platform includes a box embodiment for storing items. The box has a lid that slides on and off along grooves at the top of the box. The inside of the box contains a second compartment embodiment that is flat in design. The compartment has a lid that can be lifted by the presence of two oval-shaped holes. The presence of not just one box, but also a second interior compartment, overcomes the lack of storage of prior art.

The embodiment includes a magnetic swinging visor that acts as a page retainer. The visor has two hinges that enable it to swing upward or downward. It is held in the upward position with a magnet.

The embodiment includes an adjustable rear back support that allows for inclination. The rear back support is held in place by an oval-shaped ring and by screws. The embodiment contains hooks at the back of the frame.

The embodiment has a hole for electronic devices with wires.

The embodiment has handles with a round design at the top for ease of portability. The embodiment has a wide platform to display memorabilia and to read large books but is not bulky & ostentatious. The design of the embodiment is durable, simple and attractive, and does not sacrifice lightness for strength.

The present embodiment is designed to be ergonomically correct when used for reading. Its primary purpose is to make it easier for people to read and display art.

The present embodiment is easy to use, and one or more aspects of this embodiment incorporate various improvements to prior art. The handles make it easy to carry. The magnetic swinging visor improves readability. It allows the user to swing the visor downward, thereby not blocking text, and allows the user to view a fine art display fully. The visor in the present embodiment is stronger than any prior art thus far.

The base is durable and strong. It can hold heavy displays such as fine art, framed photographs, and memorabilia. It is not limited to hold books for reading purposes.

The compartments are novel and unobvious. They may be used to house personal items such as markers or wallets. It can hold display accessories, such as a cord or a bookmark. Adding compartments increases usefulness of the multipurpose holder.

The multipurpose holder has magnetic material and has hooks at the back. These features support the use of accessories. They provide added convenience to the user.

The multipurpose holder has a circular hole enabling a user to connect device wirings to an outlet.

A prototype has been established that demonstrates its usability. The prototype and contemplated future designs of this embodiment are different in appearance than prior art. It accomplishes a different visual effect.

BRIEF DESCRIPTION OF THE DRAWINGS

FIG. 7A-7C shows the interior secret box compartment with alternative lids.

DETAILED DESCRIPTION

Figure 1:
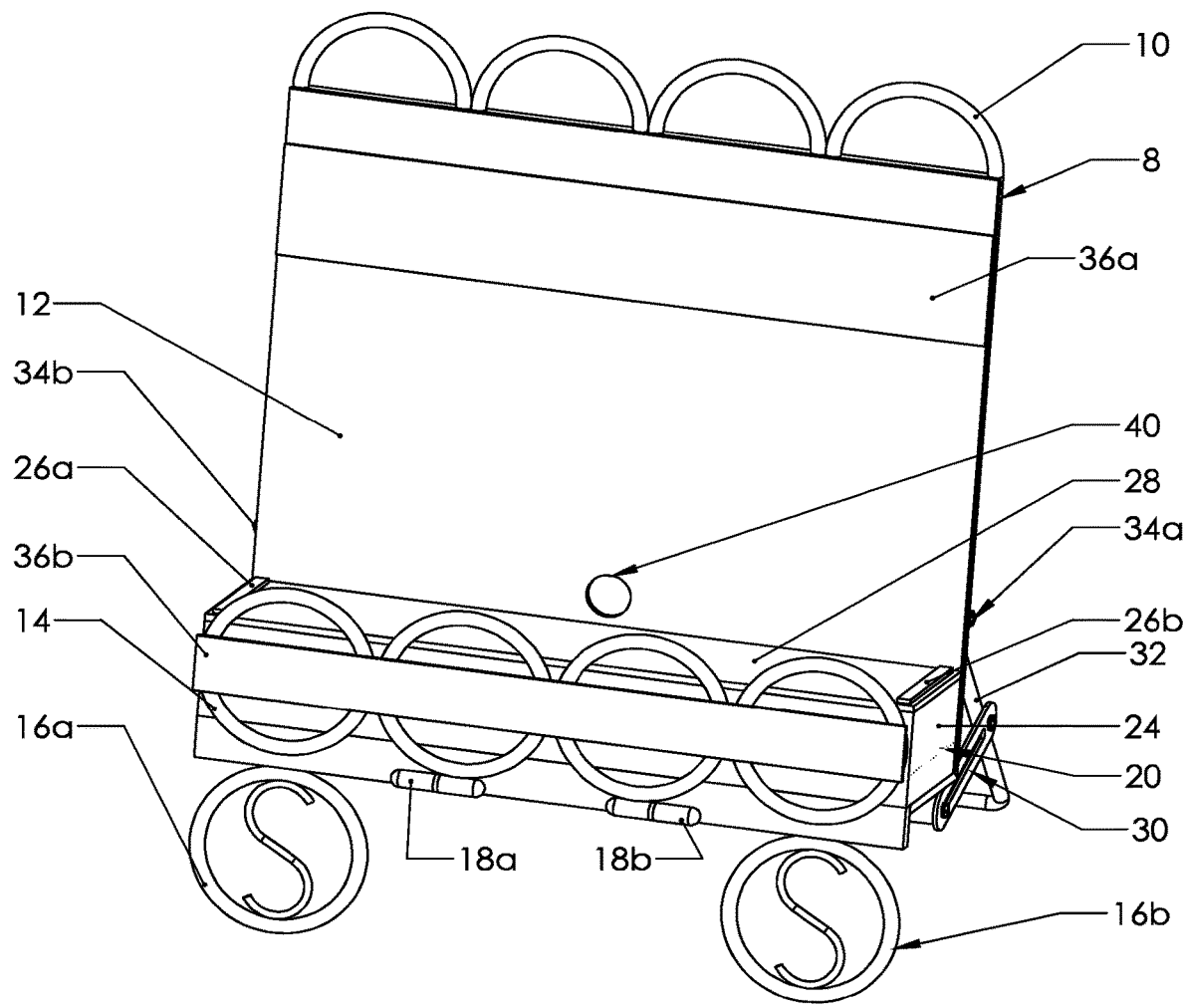
FIG. 1 is a perspective front view of the present embodiment.

The reference numerals used to describe the present invention are as follows:
8. Frame
10. Handles
12. Solid thin metal body
14. Magnetic swinging visor
15a and 15b. Visor magnets
16a and 16b. Feet
18a and 18b. Hinges
20. Interior secret box compartment
22a. Removable lid a for interior compartment
22b. Removable lid b for interior compartment
22c. Removable lid c for interior compartment
23a. Ledges built in to the box.
23b. Ledges built on the removable lid.
24. Exterior box compartment
26a and 26b. Raised extensions
28. Platform
28a. Sliding cover for exterior box
28b. Removable cover for exterior box
28c. Flip cover for exterior box
30. Oval-shaped ring
32. Adjustable rear back support
34a and 34b. Adjustors or Screws
36a and 36b. Magnetic metal
38a and 38b and 38c. Rear hooks
40. Outlet for wires FIG. 1 shows a perspective front view of the embodiment. The Adjustable Multipurpose Holder embodiment is held in place by a frame 8. I contemplate that the frame 8 measures 12" wide and 11" tall. However, these measurements may be adjusted. I presently contemplate that the inside of the frame will be made of thin metal material 12, although this material may vary. Per the present embodiment, the frame 8 forms a rectangle that comfortably fits the size of large books, files and pictures.

In FIG. 1, the top of the frame 8 has an improvement in the form of scalloped handles 10. I presently contemplate that a partially scalloped handle measure 1", with four handles running horizontally across the top. However, these measurements and the design may be adjusted. The handles 10 are shaped for portability.

In FIG. 1, the frame extends into an exterior box embodiment 24. I presently contemplate that the cubic rectangular box measures 12"×2½"×1¼". However, these measurements may be adjusted. I presently contemplate that the box is made of thin metal. However, a different material may be used. The top of the box forms the platform or base 28 and is also the cover or lid of the box 28.

FIG. 6 shows the exterior box. As shown in FIG. 6A, I presently contemplate that the cover of the exterior box 24 may be fashioned as a sliding cover 28a. As shown in a second embodiment FIG. 6B, the cover may be fashioned as a removable cover 28b. A third embodiment is shown in FIG. 6C, where the cover is a flip cover 28c.

As shown in FIG. 1, the embodiment has an interior secret compartment 20. I presently contemplate that the compartment 20 is ⅛" deep; however, this measurement may be adjusted. Items may be placed inside the compartment.

FIG. 7 shows the interior compartment. As shown in FIG. 7A, I presently contemplate that the secret compartment 20 may be designed with a removable lid 22a with two holes. A second embodiment is shown in FIG. 7B with a removable lid 22b with ledges built in to the compartment 23a. A third embodiment is shown in FIG. 7C with a removable lid 22c with ledges built on the lid itself 23b. The ledges hold the lid in place. Other designs may also be used.

Figure 4:
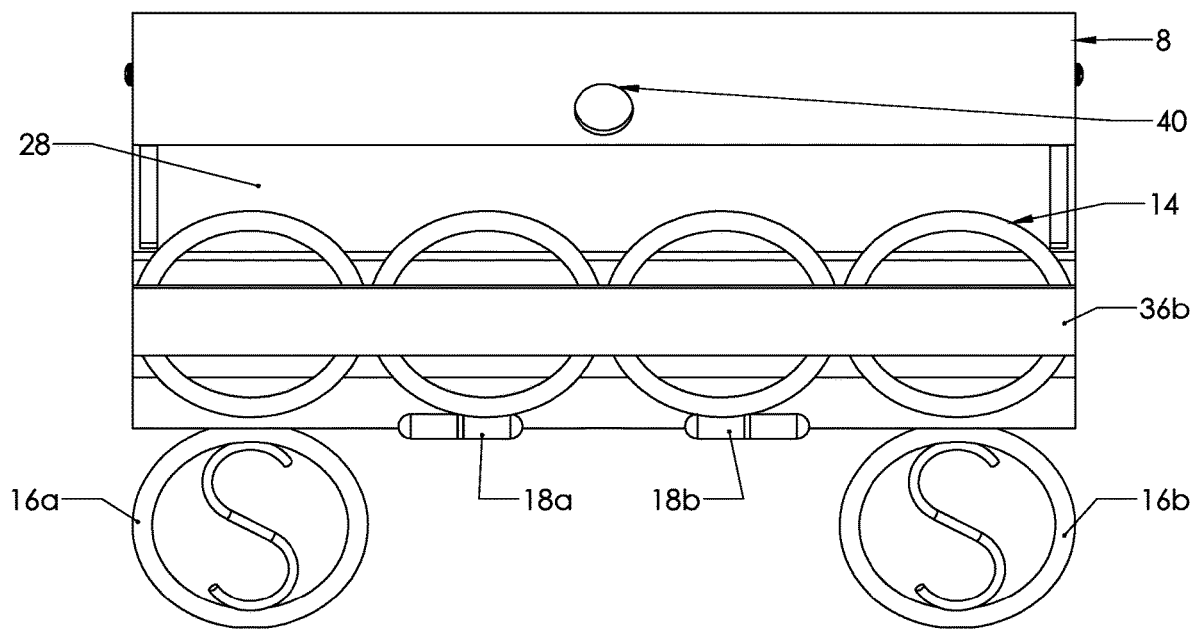
FIG. 4 shows the magnetic swinging visor in the upward position.
Figure 5:
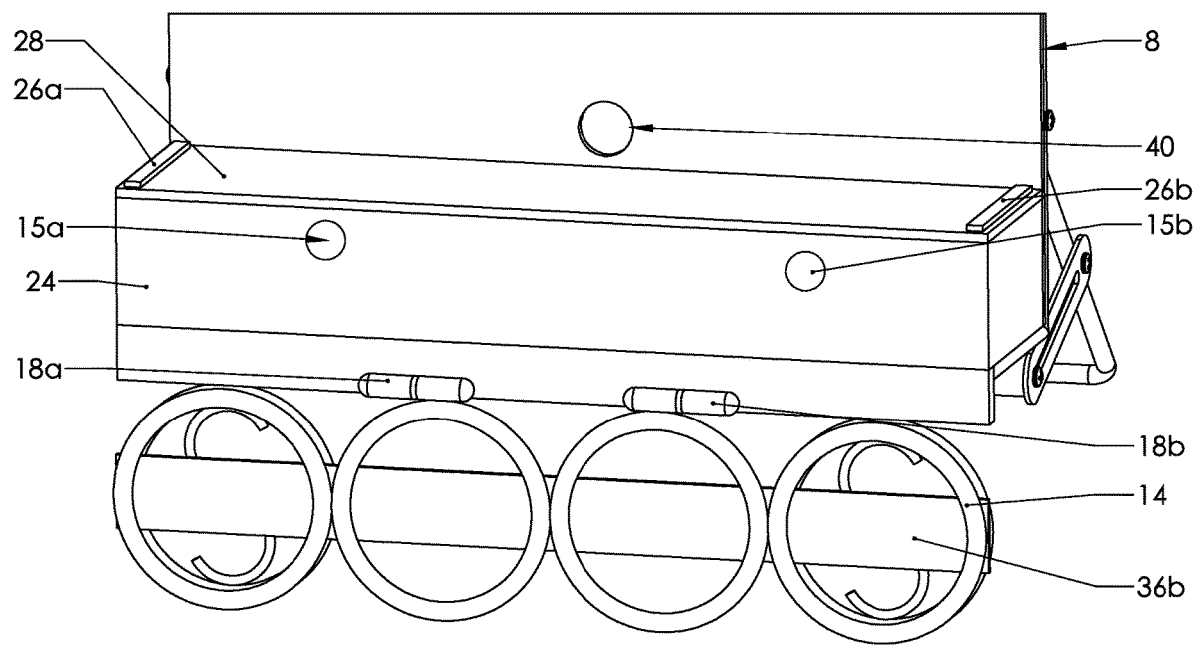
FIG. 5 shows the magnetic swinging visor in the downward position, revealing the exterior box.

FIGS. 1, 4, and 5 show the magnetic swinging visor 14, which can also be called a page retainer. I presently contemplate that the visor measures 12" wide×2½" tall, however these measurements may be adjusted. Frame 8 represents the body of the embodiment. In FIG. 4, the visor 14 is in the upward position. The magnetic material 36b can support the use of accessories. Items are placed on the platform 28. In FIG. 5, the visor 14 is in the downward position, revealing the exterior box 24 and magnets 15a and 15b. When in the upward position, the visor is held in place by magnet 15a and magnet 15b. In either position, electronic wires can be strung through the back hole 40. As shown in FIGS. 1, 4, and 5, the visor 14 is attached to the frame by hinges 18a and 18b. Foot 16a and foot 16b provide stabilization.

In FIGS. 1 and 5, the platform 28 has two raised extensions 26a and 26b on either end, preventing a book from sliding. I presently contemplate that the raised extensions are made of rubber or Velcro; however, these materials may be adjusted.

In FIG. 1, at the top of the body is magnetic material improvement 36a. I presently contemplate that the magnetic material is 12" wide×2" vertical, although these measurements may be adjusted. The visor 14 has additional magnetic material improvement 36b. I presently contemplate that the magnetic material is 12" wide×½" vertical; however, these measurements may be adjusted.

As shown in FIG. 1 and FIG. 4, there are two feet embodiments 16a and 16b that are welded to the bottom of frame 8. There is a foot on each side. I presently contemplate that the feet 16a and 16b of the frame measure 1" in diameter and both are shaped into an "S" design. However, these measurements and the design may be adjusted.

Figure 2:
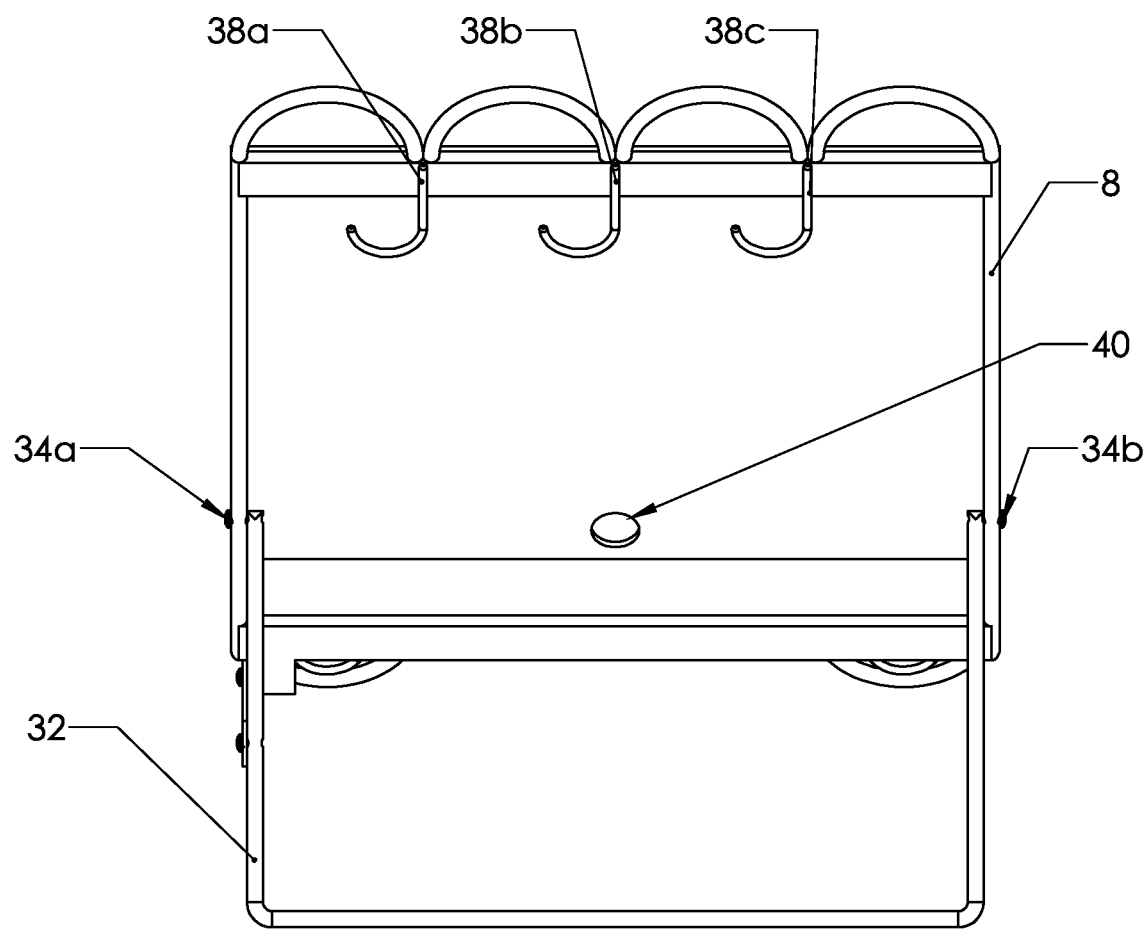
FIG. 2 is the rear view of the present embodiment, with hooks.
Figure 3:
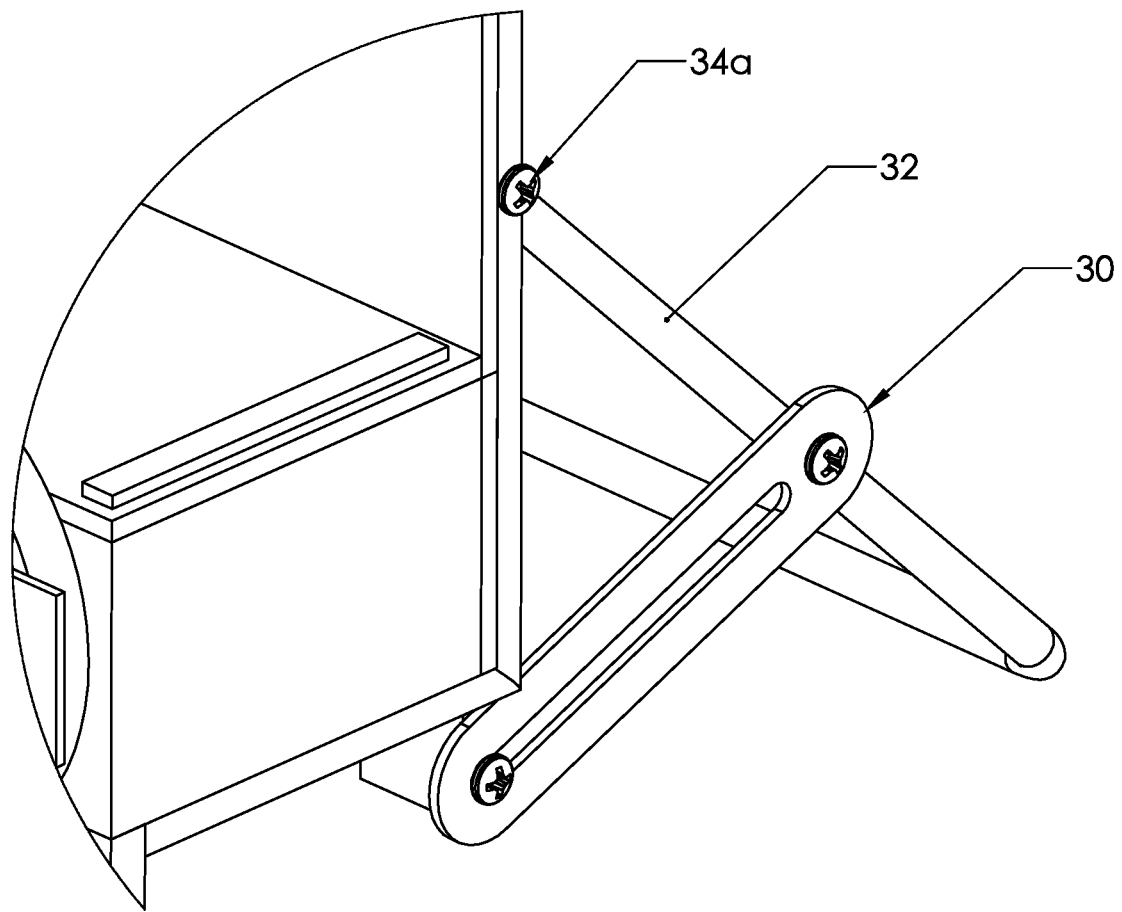
FIG. 3 is a close-up side view of the oval-shaped ring and adjustable rear back support.

FIG. 3 is a side view of the embodiment. As shown in FIGS. 1, 2, and 3, there is an adjustable rear back support 32.

I presently contemplate that the rear back support 32 measures 12"×8½". However, these measurements may be adjusted.

In FIGS. 1 and 3, the rear back support 32 is held in place by an oval-shaped ring 30. The oval-shaped ring 30 holds the Adjustable Multipurpose Holder in either a vertical position or a reclined position. I presently contemplate that the rear back support may be adjusted from 0 to 80 degrees; however, these measurements may be adjusted.

In FIG. 2 rear view and FIG. 3 side view, the frame 8 has a screw 34a and screw 34b attached to each side. The rear back support 32 is attached to frame 8 by the screws. I presently contemplate that each screw 34a and 34b is attached at 8" vertical. However, these measurements may be adjusted.

FIG. 2 shows a rear view of the Adjustable Multipurpose Holder. There are three hook improvements. Hook improvement 38a, hook improvement 38b, and hook improvement 38c support the use of accessories.

FIG. 2 shows a round hole improvement 40 that supports the use of wires running from the device.

OPERATION

FIG. 1. Hold the device by scalloped handles 10 to place the Adjustable Multipurpose Holder on a flat surface. Foot 16a and foot 16b will provide stability. The inclination is determined by the angle of a rear back support 32. The inclination is locked in place by an oval-shaped ring 30 and adjustor screws 34a and 34b. A platform 28 is where the user will place the item. Hole 40 is a place to insert wires. Items are supported by a frame 8, the solid body 12, the platform 28, and the magnetic swinging visor 14. Hinges 18a and 18b enable the visor to swing upward and downward. When in the downward position, raised extensions 26a and 26b prevent the item from sliding. When items are removed, other components may be placed inside the exterior box 24 and the interior compartment 20. Magnetic accessories may be attached to magnetic areas 36a and 36b.

FIG. 2. Adjust the angle by pulling back on the rear back support 32 to a desired inclination. Tighten the adjuster screws 34a and 34b for a stronger hold. Use the hooks 38a and 38b to attach accessories such as removable bookmarks, which can be strung from the back to the front of the Adjustable Multipurpose Holder. Use the hook 38b to attach items such as keys.

FIG. 3. Adjust the angle by pulling on the rear back support 32 to a desired inclination. The oval-shaped ring 30 will hold it in place at its furthest inclination. Tighten the adjustor screw 34a for a stronger hold.

FIG. 4. Place a book, electronic device, or painting on the platform 28. The hinges 18a and 18b allow the visor 14 to swing upward. Frame 8 and visor 14 hold the item in place. The hole 40 allows wires to connect an electronic device to an outlet. Magnetic material 36b supports the use of accessories such as nameplates, clocks, and flashlights. Foot 16a and foot 16b provide stabilization.

FIG. 5. To improve visibility or facilitate page turning, turn the visor 14 to the downward position. Accessories should be removed from the magnetic material 36b first. Frame 8 and raised extensions 26a and 26b will hold the item in place. To access the exterior box 24, to access the hole 40, or to remove any item from the platform 28, again turn the visor 14 to the downward position. Hinges 18a and 18b allow the visor to swing downward. The user can see the magnets 15a and 15b.

Figure 6A:
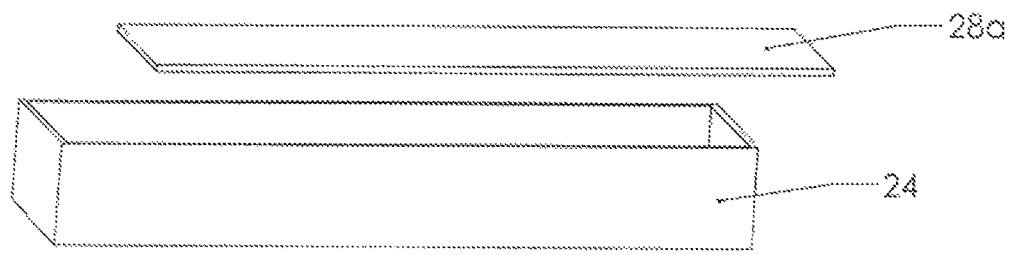
FIG. 6A shows the exterior box with an alternative cover covers.
Figure 6B:
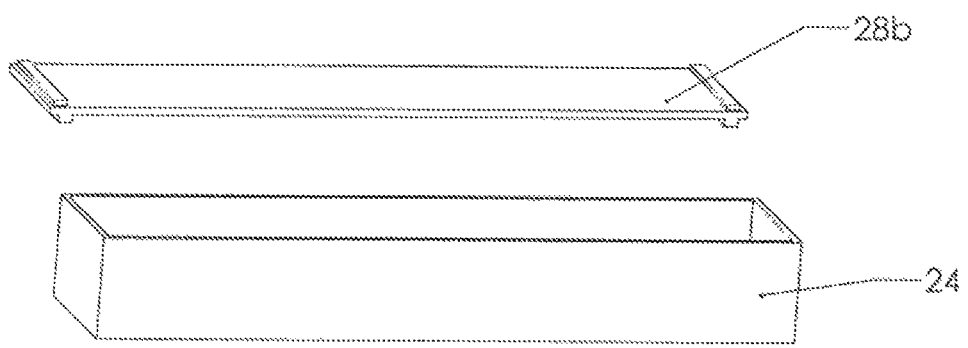
FIG. 6B shows another embodiment of the exterior box and cover.
Figure 6C:
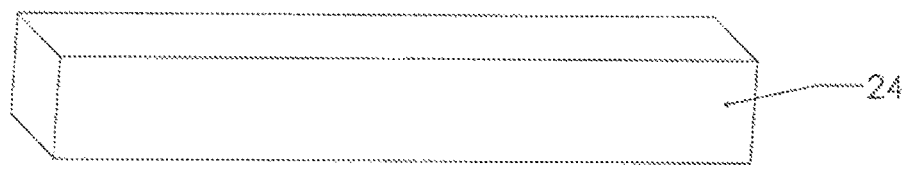
FIG. 6C shows yet another embodiment of the exterior box and cover.
Figure 6C:
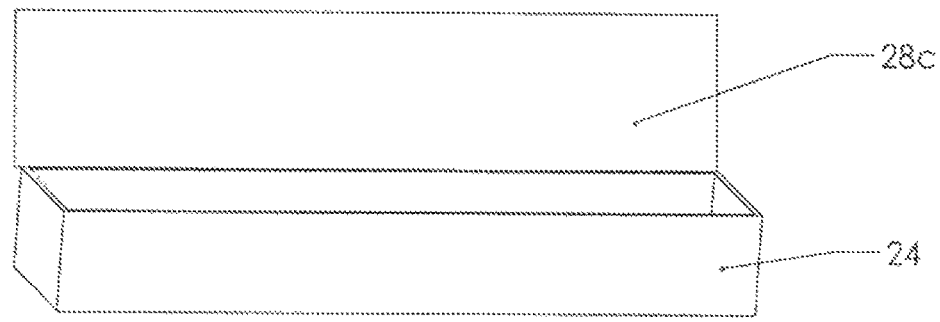

FIGS. 6A, 6B, and 6C. These FIGS. illustrate how to open the exterior box. As shown in 6A, slide cover 28a on and off via the grooves in the exterior box 24. In the alternative, as shown in 6B, remove cover 28b completely from the exterior box 24. Another alternative, as shown in 6C, is to flip open cover 28c which will stay attached to the exterior box 24. Items may be placed inside or removed from the box.

FIGS. 7, 7A, 7B, and 7C. These FIGS. illustrate how to open the interior compartment. First, the exterior box in FIGS. 6A, 6B, and 6C must be open. Then, as shown in 7A, lift lid 22a from the compartment 20 via two holes on either side of the lid. In an alternative design, as shown in 7B, lid 22b is held in place by ledges 23a that are built in to the inner compartment. To access the inner compartment 20, push down on the corner of the lid 22b where the ledges are not located. The lid functions like a teeter-totter. In another alternative, as shown in 7C, lid 22c is held in place by ledges 23b that are built on the lid itself. To access the inner compartment 20, push down on the corner of the lid 23b where the ledge is not built. The other side will lift, and the lid may be removed.

The reader will see that one or more embodiments provide a durable, easy-to-use book and fine art holder that allows for readability and storage. While the above description contains many specificities, these should not be construed as limitations on the scope, but rather as an example of several embodiments thereof. Many other variations are possible. For example, it can be used as a cookbook stand, an electronic device holder, a stand for ornamental displays, a storage unit, a jewelry holder, a mailbox, a sewing kit holder, and so forth.

Although the dimensions are predetermined, the size of the embodiment can be built small enough to hold any type of phone or any type of tablet. It can be built large enough for a painting of any size. The box embodiment can be of varying widths and heights but should correspond with the size of the Adjustable Multipurpose Holder. The feet embodiments can vary in size but should be strong enough to support the Adjustable Multipurpose Holder. The feet should be complementary in size to the legs.

The embodiments may be made of different materials or colors. It has been demonstrated with prototypes that the Adjustable Multipurpose Holder can be made with light foam material, plastic, and various types of metal. The presently contemplated design is made of a thin magnetic metal.

The attraction component of the magnetic material will facilitate the use of many different accessories. The magnetic body and the visor can hold name plates, magnetic business cards, book marks, flashlights and school logos. The possibilities are endless.

The platform may also be made with different designs. I contemplate a flat base platform. It can also be made with holes or vertical spools, such as to hold sewing items like thread, and to hold women's make-up items like lipstick, nail polish, make-up brushes, and so forth.

Accordingly, the scope should be determined not by the embodiments illustrated, but by the claims and their legal equivalents.

What is claimed is:
1. A multipurpose object holder, comprising:
 a rectangular box having a top, bottom, two opposite elongated sides having a length, width and depth creating an inner volume enabled to hold objects;
 a cover including means of attaching to the box and enabled to completely cover the inner volume;

a solid planar vertical support having a height, top edge, bottom edge, front and back in supported by a frame having a same length as the box, the vertical support and frame aligned and attached adjacent to one of the elongated sides of the box and extending vertically up in a direction of the top of the box, thereby forming the height;

wherein the height of the vertical support is at least twice the depth of the box; and wherein a retainer strip is formed along and adjacent to the elongated side of the box opposite the side adjacent to the vertical support, and the retainer strip rotates in a downward direction via one or more hinges attaching the retainer strip to the box.

2. The object holder of claim 1, wherein the volume of the rectangular box includes a separate volume formed by a second cover having a same rectangular shape as the box and securely positioned within the volume.

3. The object holder of claim 1, wherein the frame includes an adjustable angle portion extending outwards away from the box enabled to support the box and frame in an upright position, reclined position or a position in between.

4. The object holder of claim 1, wherein the front of the vertical support includes another retainer strip.

5. The object holder of claim 1, wherein the box is supported by feet having a height.

6. The object holder of claim 2, wherein the second cover is held in position by opposing ledges attached to inner walls of the box.

7. The object holder of claim 1, wherein the top edge of the vertical support includes a handle.

8. The object holder of claim 1, wherein the vertical support includes a portion of magnetic material.

* * * * *